(12) United States Patent
Hooper

(10) Patent No.: US 6,365,867 B1
(45) Date of Patent: Apr. 2, 2002

(54) PLASMA ARC TORCH WITH COAXIAL WIRE FEED

(75) Inventor: Frederick M Hooper, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/704,438

(22) Filed: Nov. 1, 2000

(51) Int. Cl.[7] .............................................. B23K 10/02
(52) U.S. Cl. ............................ 219/121.45; 219/121.46; 219/121.36
(58) Field of Search ................. 219/121.45, 121.36, 219/121.46, 121.47, 121.5, 121.51, 121.48, 76.16, 75, 136, 130.04; 313/231.3, 231.4, 231.5, 231.6

(56) References Cited

U.S. PATENT DOCUMENTS

| | | | |
|---|---|---|---|
| 3,950,629 A | * 4/1976 | Auzary et al. ................. | 219/75 |
| 3,969,603 A | * 7/1976 | Boughton et al. ..... | 219/121.46 |
| 4,016,397 A | * 4/1977 | Essers et al. .......... | 219/121.46 |
| 4,225,769 A | * 9/1980 | Wilkins .................... | 219/130.4 |
| 4,234,779 A | * 11/1980 | Willems ................. | 219/121.36 |
| 4,321,454 A | 3/1982 | Willems et al. .............. | 219/121 |
| 4,924,053 A | 5/1990 | Morgan et al. ................ | 219/75 |
| 5,137,223 A | 8/1992 | Brandon et al. ............... | 242/54 |
| 5,414,237 A | * 5/1995 | Carkhuff ................ | 219/121.51 |

* cited by examiner

Primary Examiner—Teresa Walberg
Assistant Examiner—Quang Van
(74) Attorney, Agent, or Firm—Robert D. Watson

(57) ABSTRACT

A plasma arc welding apparatus having a coaxial wire feed. The apparatus includes a plasma arc welding torch, a wire guide disposed coaxially inside of the plasma arc welding torch, and a hollow non-consumable electrode. The coaxial wire guide feeds non-electrified filler wire through the tip of the hollow non-consumable electrode during plasma arc welding. Non-electrified filler wires as small as 0.010 inches can be used. This invention allows precision control of the positioning and feeding of the filler wire during plasma arc welding. Since the non-electrified filler wire is fed coaxially through the center of the plasma arc torch's electrode and nozzle, the wire is automatically aimed at the optimum point in the weld zone. Therefore, there is no need for additional equipment to position and feed the filler wire from the side before or during welding.

36 Claims, 4 Drawing Sheets

PLASMA ARC TORCH WITH COAXIAL WIRE FEED

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

The present invention relates generally to plasma arc welding, and more specifically to a plasma arc welding device with coaxial wire feed for providing filler metal directly to the weld zone with high precision.

Filler wire is typically added during arc welding. Conventionally, filler wire is usually fed into the weld zone from the side via a wire feeder from a source such as a spool, through a conduit to the weld zone, and then aimed into the weld via a tip on the conduit. This mechanism is satisfactory for large welds where precise aiming of the filler wire is not required. However, the need to precisely aim the wire becomes critical in applications in which the weld pool is very small. In this case, the filler wire is correspondingly very small.

Present commercial/industrial arc welding technology employs a filler wire that is typically 0.030 inches in diameter or greater and a welding arc heat input that results in a large weld pool. The resultant weld is also large and is primarily useful for large weldments used in industry.

In order to fill a need for welding thinner materials and applications in which greater precision was required, a special wire feeder was developed as reported in U.S. Pat. No. 5,137,223, to Brandon et al. This invention was designed to feed small diameter (on the order of 0.010 inches) wire for miniature applications or for welding near heat-sensitive components. However, a high degree of precision is required to feed the wire into the small weld pool.

U.S. Pat. No. 4,321,454, to Willems et al. discloses the integration of the gas metal arc welding torch with a plasma arc in which the consumable electrode is coaxially fed. That device produces a high heat input arc weld that is not suitable for smaller welds in or near heat-sensitive components.

U.S. Pat. No. 4,924,053, to Morgan et al. discloses a gas tungsten arc welding device through which wire is coaxially fed. However, the tip of the tungsten electrode is located off to the side of the wire. This results in a change in bead characteristics depending on the orientation of the tip with respect to the direction of weld.

Accordingly, the need remains for a welding process that fills the gap between the small, high-energy-density laser and electron beam welds and the conventional, large arc welds, while providing filler metal via a self-contained, coaxial wire feed mechanism having high precision.

SUMMARY OF THE INVENTION

The present invention relates to a plasma arc torch apparatus with coaxial wire feed capability, comprising: a wire guide and a coaxial, hollow non-consumable electrode; wherein the wire guide directs filler wire through the tip of the hollow non-consumable electrode. The plasma arc melts the tip of the filler wire and deposits the molten material on the workpiece. Although the filler wire is fed directly through the center of the plasma arc torch and out through the center of the hollow electrode, the wire itself is not an electrode and does not carry any current. In this sense, the filler wire is non-electrified. Since the filler wire is fed coaxially through the center of the plasma arc torch's electrode and nozzle, there is no need for additional equipment to position and feed the filler wire from the side. The present invention can provide uniform welds substantially no matter what direction changes occur during welding.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

The present invention relates to a plasma arc welding torch apparatus, method, and resulting weld wherein a filler wire is fed through the center of a coaxial, hollow, non-consumable electrode of the plasma arc welding torch, resulting in the melting of the filler wire. Although the filler wire is fed directly through the center of the plasma arc torch and out through the center of the hollow electrode, the wire itself is not an electrode and does not carry any current. In this sense, the filler wire is non-electrified.

The resulting molten filler wire material is transferred out of a nozzle to the base material by the action of the plasma arc. The base material (weldment) may or may not be simultaneously melted, depending on the application.

Since the filler wire is fed coaxially through the center of the plasma arc torch's electrode and nozzle, the wire is automatically aimed at the optimum point in the weld zone. Therefore, there is no need for additional equipment to position and feed the filler wire from the side before or during welding.

Figure 1:
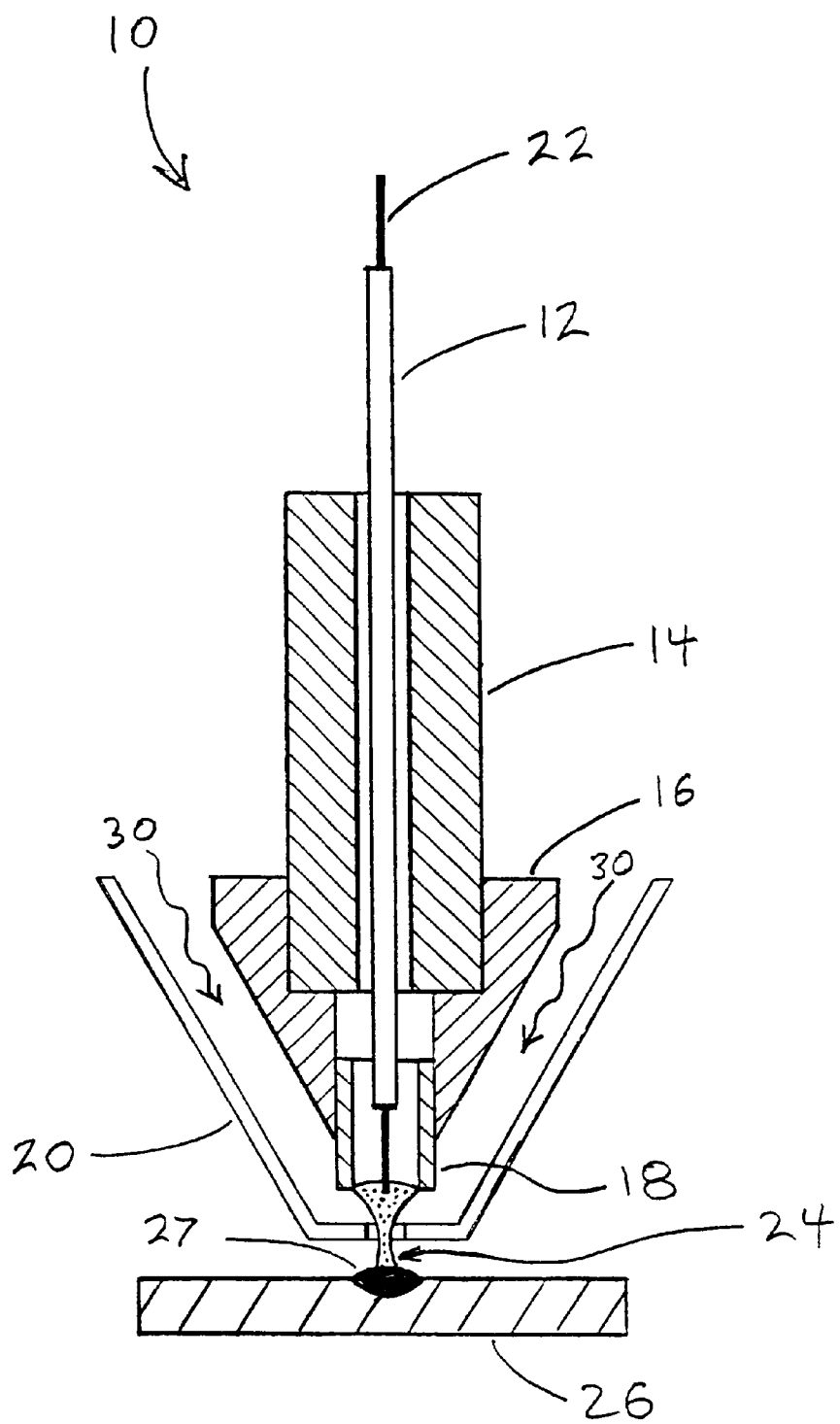
FIG. 1 is a schematic cross-section view of a first example of a plasma arc torch with coaxial wire feed, according to the present invention.

FIG. 1 is a schematic cross-section view of a first example of a plasma arc torch 10 with coaxial wire feed, according to the present invention. The plasma arc welding torch 10 comprises coaxial wire guide 12, non-conductive coaxial wire guide holder 14, electrode adapter 16, coaxial hollow non-consumable electrode 18, and nozzle 20. Plasma arc 24 is formed by ionizing flowing plasma gas 30 (e.g. argon, oxygen, hydrogen) by first striking a low current arc between electrode 18 and nozzle 20, and then transitioning to a high current (e.g. 25 amps) arc between electrode 18 and workpiece 26. Filler wire 22 is fed through the wire guide 12 and out through the tip of coaxial, hollow electrode 18, where it is melted by plasma arc 24 and deposited as weld bead 27 on workpiece 26. Coaxial wire guide holder 14 holds wire guide 12 in coaxial alignment, and prevents feed wire 22 from contacting the inside wall of hollow electrode 18.

Filler wire 22 can be as small as 0.010 inches in diameter or finer. However, larger diameter wire can be used. Filler wire 22 can be fed by a wire feed mechanism 28 such as disclosed in U.S. Pat. No. 5,137,223, which is herein incorporated by reference. Hollow non-consumable electrode 18 can be made of tungsten or tungsten alloys (e.g. tungsten with thoria or zirconia additions). Electrode adapter 16 can be made of copper or a copper alloy. Non-conductive coaxial wire guide holder 14 can be made of an electrically non-conductive material, such as phenolic, ceramic, or polymer material. Wire guide 12 can be a hypodermic needle, and can be made of a stainless steel.

The present invention automatically aims and positions filler wire 22 at the optimum point relative to weld bead 27 during plasma arc welding. No extra hardware or manipulation is required to position or aim the filler wire before or during welding. This arrangement results in a weld bead 27 that is uniform regardless of the direction of weld or orientation of welding torch 10 because filler wire 22 is fed coaxially through the center of the tip of the hollow non-consumable electrode 18. Because the filler wire 22 is not fed from the side of the welding torch, no additional access is required around the side of the welding torch for a wire feeder. The motion of the torch relative to the wire feeder and workpiece is of no consequence. The latter factor is especially important when the path of the weld is non-linear as when welding around the periphery of a part. Also, the wire is inherently shielded by the inert gas flowing around the welding arc.

The plasma arc welding torch 10 can also be employed as a cutting torch when the arc is used with oxygen gas feed to achieve higher plasma arc temperatures that are more appropriate for melting and cutting. In this case, filler wire 22 is not fed during the cutting process.

Figure 2:
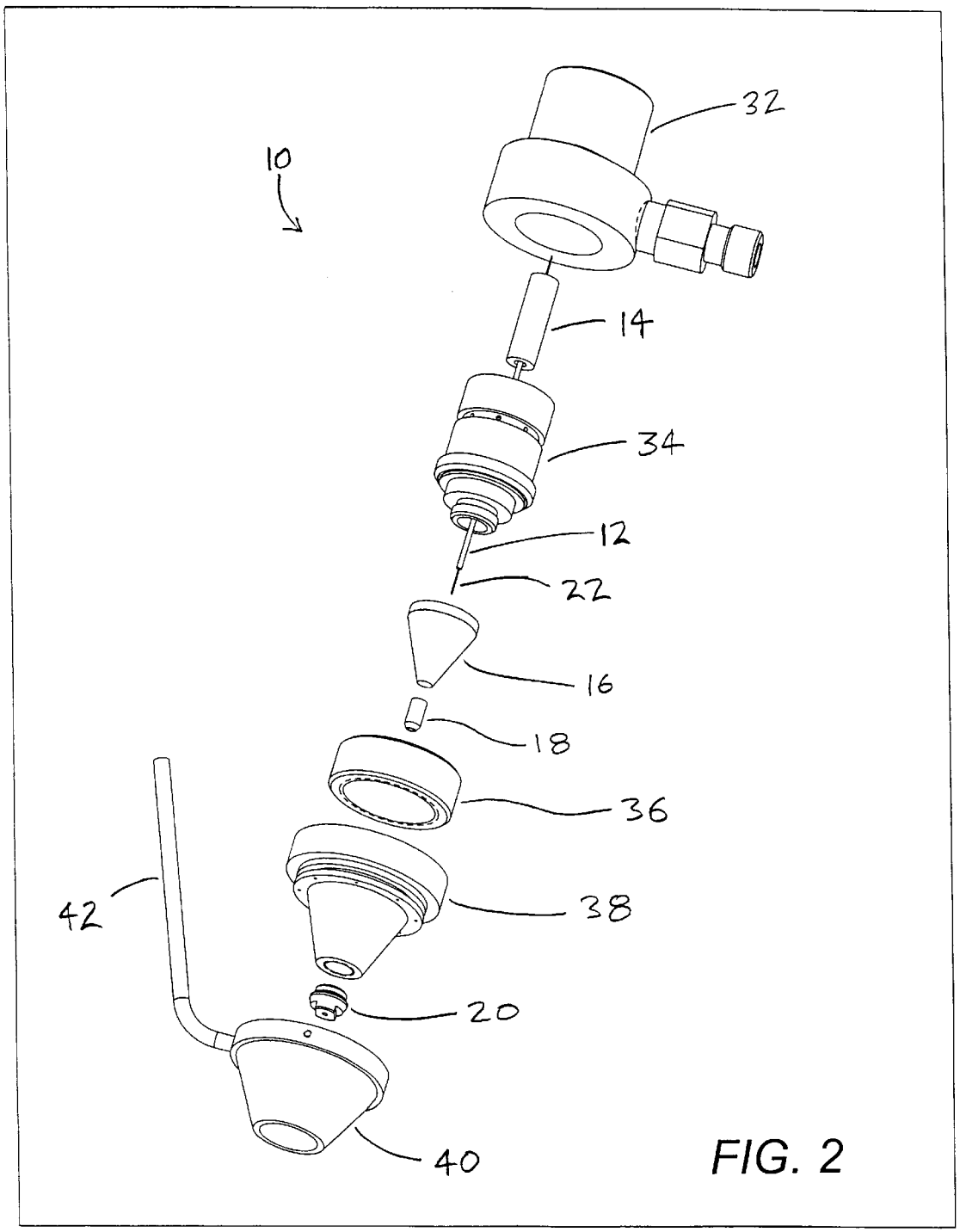
FIG. 2 shows an exploded isometric view of a second example of a plasma arc torch with coaxial wire feed, according to the present invention.
Figure 3:
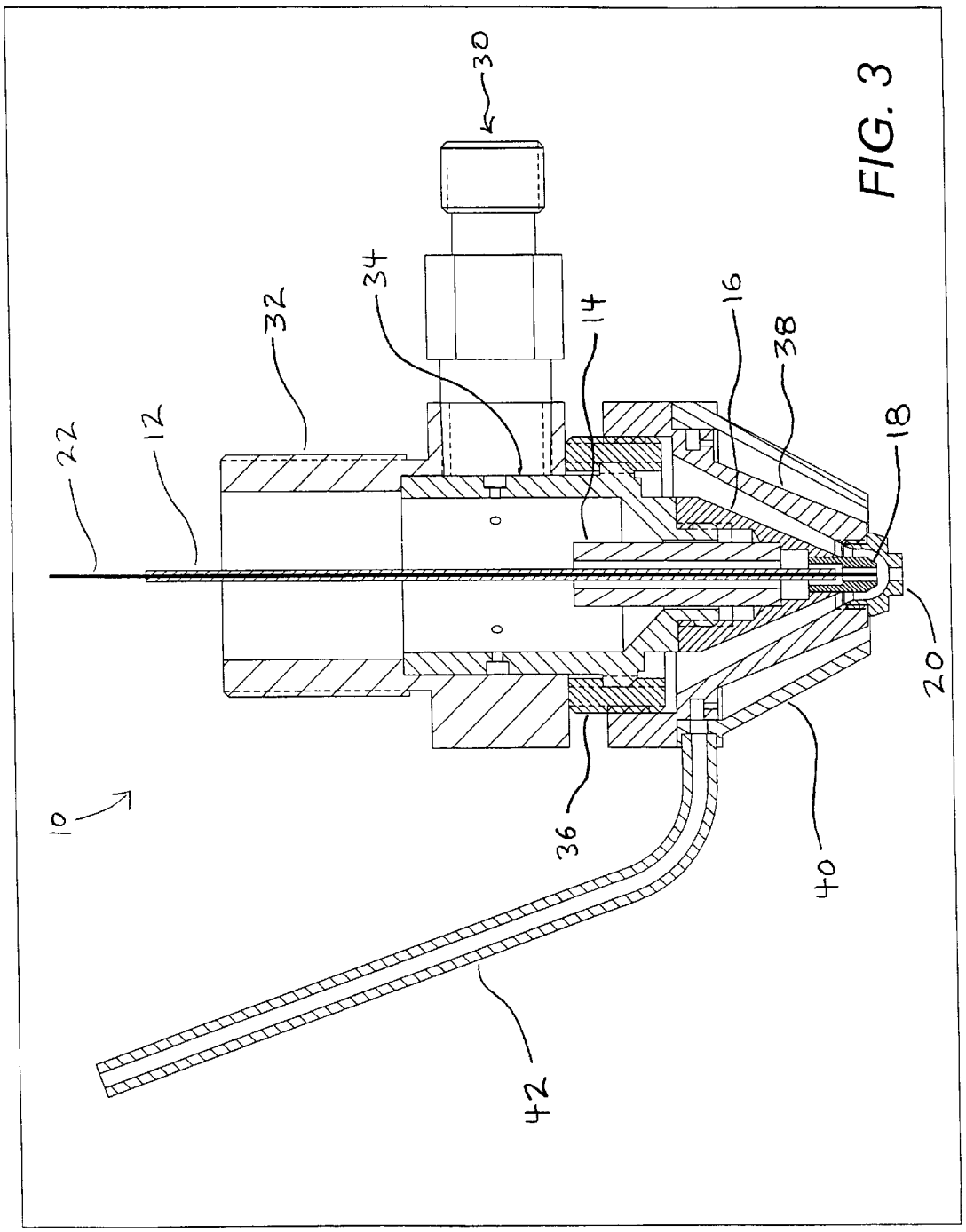
FIG. 3 shows a cross-section view of a second example of a plasma arc torch with coaxial wire feed, according to the present invention.
Figure 4:
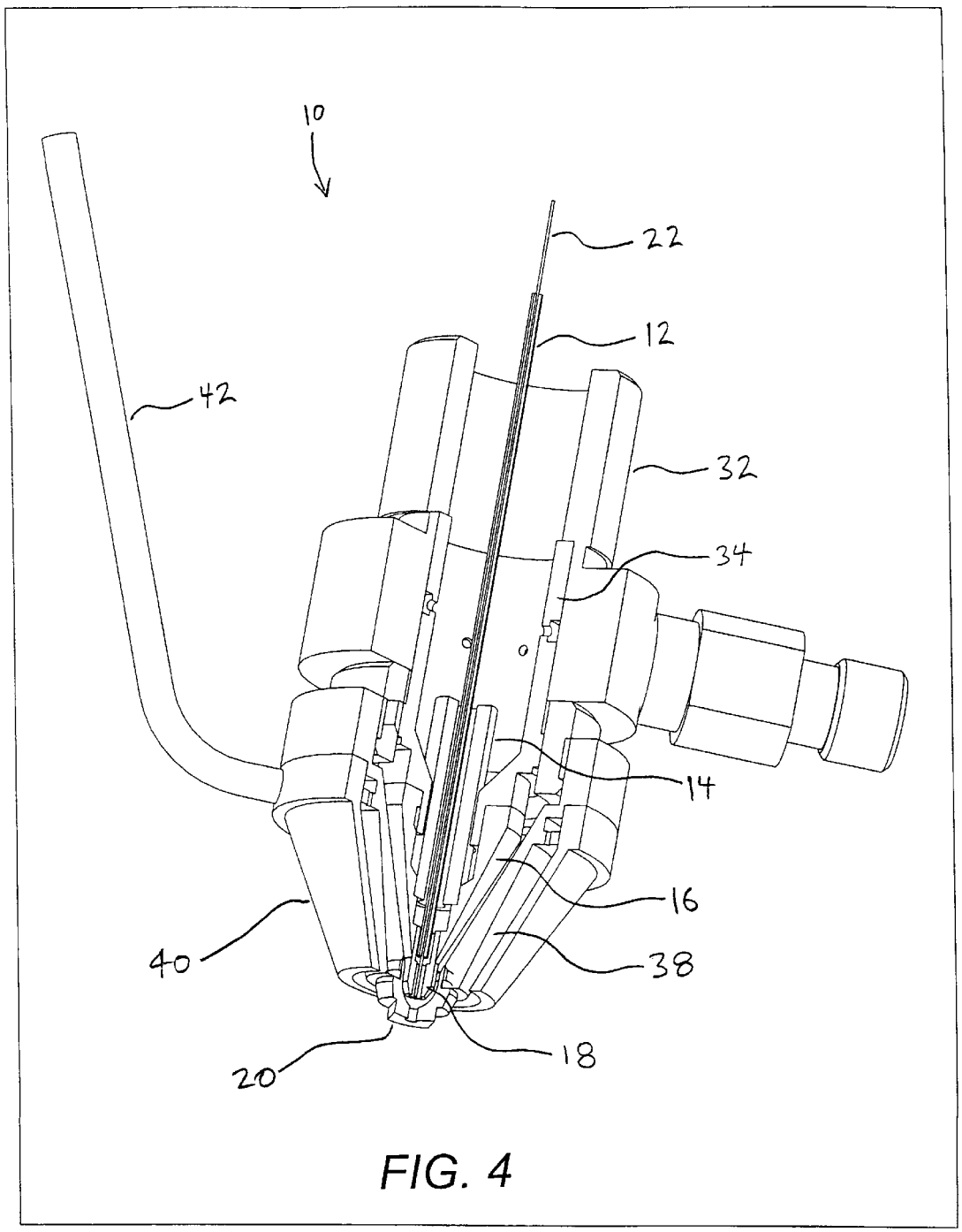
FIG. 4 shows an assembled, cutaway isometric view, of a second example of a plasma arc torch with coaxial wire feed, according to the present invention.

FIG. 2 shows an exploded isometric view, and FIG. 3 shows a cross-section view, and FIG. 4 shows an assembled, cutaway isometric view, of a second example of a plasma arc torch with coaxial wire feed, according to the present invention. Traversing from top to bottom, plasma arc torch 10 comprises an adapter housing 32, which supplies electrical power and plasma gas 30 (e.g. argon) to torch 10. Adapter housing 32 can have an open top end through which filler wire 22 is fed by an external wire feed mechanism (not shown). Electric current is also fed through adapter housing 32 to create the plasma arc. Adapter housing 32 can have external threads for attaching the unit to a multi-axis positioning mechanism or robotic arm (not shown).

In FIGS. 2–4, gas distributor 34 is attached inside of adapter housing 32, and contains a plurality of holes for distributing gas 30 coaxially around the outer circumference of electrode adapter 16 and hollow electrode 18. Electrode adapter 16, which has a tapered conical outside surface and a stepped, hollow interior surface, is attached at the proximal end to gas distributor 34. Hollow electrode 18 is coaxially attached to the distal end of electrode adapter 16. Ceramic insulator ring 36 is coaxially attached to gas distributor 34 via screw threads. Conical-shaped nozzle/gas shroud support 38 is coaxially attached to the outside of ceramic insulator ring 36 via screw threads. Plasma gas 30 flows in-between electrode adapter 16 and nozzle/gas shroud support 38. Nozzle 20 is coaxially attached to the distal end of nozzle/gas shroud support 38. Gas shroud 40 is coaxially attached to the outside of nozzle/gas shroud support 38, and provides a coaxial flow of non-oxidizing shielding gas (e.g. argon, helium, nitrogen) that surrounds plasma arc 24 and reduces contamination and oxidation of weld bead 27 during welding. Gas supply tube 42 supplies shielding gas to gas shroud 40.

In FIGS. 2–4, filler wire 22 is aligned with the central axis of plasma arc torch 10, and is fed through coaxial wire guide 12. Coaxial wire guide 12 is supported by non-conductive coaxial wire guide holder 14. Wire guide holder 14 is supported by electrode adapter 16 and by gas distributor 34. During welding, filler wire 22 is pushed through wire guide 12 by a wire feed mechanism (not shown). The tip of filler wire 22 is melted by plasma arc 24 formed between coaxial hollow non-consumable electrode 18 and workpiece 26. Melted material from filler wire 22, carried by ionized plasma gas 30, flows through a central opening in nozzle 20 and deposits onto workpiece 26 in weld bead 27.

Successful welds have been made using a prototype plasma arc welder with coaxial wire feed. An experimental plasma arc welding torch, previously modified for passing a laser beam through the central axis of the welding torch and out through a coaxial hollow electrode, was modified to accept a wire guide and wire guide holder, so that filler wire could be fed though the hollow electrode instead of a laser beam. The wire guide holder 14 was made of a phenolic material, and had a 0.030 inch inner diameter to hold a hypodermic needle (e.g. wire guide 12). In these experiments, plasma arc current was approximately 25 amps. Filler wire made of 718 Inconel and 308 stainless steel, 0.010 inch diameter, were both used and provided excellent weld beads on 718 Inconel and 304 SS plate, respectively. The plasma gas was argon, and helium was used as the shielding gas. Torch travel speed ranged from 15–30 inches/minute. Filler wire feed rates ranged from 8–10 inches of wire per inch of weld. In one experiment, a ceramic guide was fabricated and inserted into the upper end of the hollow electrode 18 in order to help prevent the wire 22 from touching the side of the hollow electrode 18 by allowing the wire guide 12 to extend into the hollow electrode 18.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A plasma arc welding apparatus comprising:
    a plasma arc torch, having a hollow non-consumable electrode;
    a wire guide, disposed coaxially inside of the plasma arc torch; wherein the wire guide directs filler wire through the center of the hollow non-consumable electrode during plasma arc welding;
    a non-conductive wire guide holder, disposed coaxially inside of the plasma arc torch, for holding the wire guide; and
    a coaxial electrode adapter affixed both to the non-conductive wire guide holder and the hollow non-consumable electrode, whereby the wire guide is centered within the hollow non-consumable electrode, thereby preventing the filler wire from contacting the hollow non-consumable electrode during plasma arc welding.

2. The apparatus of claim 1, wherein the wire guide comprises a hypodermic needle.

3. The apparatus of claim 1 wherein said wire guide comprises an inner diameter suitable for directing filler wire of approximately 0.010 inches diameter or finer.

4. The apparatus of claim 1 further comprising oxygen assist gas means permitting said apparatus to be employed as a cutting torch.

5. The apparatus of claim 1, further comprising a coaxial ceramic guide, disposed inside of the hollow non-consumable electrode, for supporting the wire guide inside of the hollow non-consumable electrode.

6. The apparatus of claim 1, wherein the coaxial electrode adapter has a tapered conical outside surface and a stepped, hollow interior surface.

7. The apparatus of claim 1, wherein the coaxial electrode adapter comprises a material selected from the group consisting of copper and a copper alloy.

8. The apparatus of claim 1, wherein the hollow non-consumable electrode comprises a material selected from the group consisting of tungsten, tungsten alloy, tungsten with thoria addition, and tungsten with zirconia addition.

9. The apparatus of claim 1, wherein the hollow non-consumable electrode is removeably attached to the coaxial electrode adaptor.

10. The apparatus of claim 1, further comprising a gas distributor coaxially attached to the upper end of the coaxial electrode adaptor.

11. The apparatus of claim 10, wherein the gas distributor comprises a plurality of holes for distributing gas coaxially around the outer circumference of the electrode adaptor.

12. The apparatus of claim 10, further comprising an adaptor housing attached to the gas distributor.

13. The apparatus of claim 12, wherein the adaptor housing comprises means for attaching the adaptor housing to a multi-axis positioning mechanism or robotic arm.

14. The apparatus of claim 12, wherein the adaptor housing comprises an open top end through which the filler wire can be fed by an external wire feed mechanism.

15. The apparatus of claim 12, wherein the adaptor housing comprises means for feeding electric current to create the plasma arc, and further comprises means for supplying plasma gas to the plasma torch.

16. The apparatus of claim 10, further comprising a ceramic insulator ring coaxially attached to the gas distributor.

17. The apparatus of claim 16, further comprising a conically shaped nozzle/gas shroud support attached to the ceramic insulator ring, wherein plasma gas flows coaxially in-between the conically shaped nozzle/gas shroud support and the coaxial electrode adaptor, and flows coaxially past the outside surface of the hollow non-consumable electrode, without flowing inside of the hollow non-consumable electrode.

18. The apparatus of claim 17, further comprising a nozzle attached to the distal end of the nozzle/gas shroud support.

19. The apparatus of claim 18, wherein the nozzle is removeably attached to the distal end of the nozzle/gas shroud support.

20. The apparatus of claim 17, further comprising a gas shroud coaxially attached to the outside of the nozzle/gas shroud support, for providing a coaxial flow of non-oxidizing shielding gas that surrounds the plasma arc and reduces contamination and oxidation of a weld bead during welding.

21. The apparatus of claim 20, further comprising a gas supply tube attached to the gas shroud for providing the non-oxidizing shielding gas to the gas shroud.

22. The apparatus of claim 1, further comprising a ceramic guide inserted into the upper end of the hollow non-consumable electrode, to help prevent the filler wire from touching the side of the hollow non-consumable electrode by allowing the wire guide to extend into the hollow non-consumable electrode.

23. The apparatus of claim 1, wherein the tip of the filler wire is located approximately flush with the lower end of the hollow non-consumable electrode.

24. A method of welding a workpiece, comprising using the plasma torch of claim 1.

25. A plasma arc welding method, comprising the steps of:

providing a plasma arc welding torch having a hollow non-consumable electrode and a wire guide disposed coaxially inside of the plasma arc torch;

striking a plasma arc between the torch and a workpiece; and feeding filler wire coaxially through the wire guide and through the hollow non-consumable electrode into the plasma arc;

whereby the tip of the filler wire is melted by the plasma arc and deposited onto the workpiece;

wherein the plasma arc welding torch further comprises a non-conductive wire guide holder, disposed coaxially inside of the plasma arc torch, for holding the wire guide; and wherein the plasma arc welding torch further comprises a coaxial electrode adapter affixed both to the non-conductive wire guide holder and the hollow non-consumable electrode, whereby the wire guide is centered within the hollow non-consumable electrode, thereby preventing the filler wire from contacting the hollow non-consumable electrode during plasma arc welding.

26. The method of claim 25, wherein the wire guide comprises an inner diameter suitable for directing filler wire of approximately 0.010 inches diameter or finer.

27. A workpiece having metal deposited on it, made by performing the method of claim 25.

28. A weld between two workpieces, made by performing the method of claim 25.

29. The method of claim 25, wherein the plasma arc comprises a plasma gas selected from the group consisting of argon, oxygen, and hydrogen, and combinations thereof.

30. The method of claim 25, further comprising providing a coaxial flow of non-oxidizing shielding gas that surrounds the plasma arc and shields the filler wire from oxidation and reduces contamination and oxidation of a weld bead during welding.

31. The method of claim 30, wherein the non-oxidizing shielding gas is selected from the group consisting of argon, helium, and nitrogen, and combinations thereof.

32. The method of claim 25, wherein the plasma arc comprises a current of approximately 25 amps.

33. The method of claim 25, wherein the filler wire is fed at a rate from about 8–10 inches of wire per inch of weld, and further wherein the torch travel speed is about 15–30 inches/minute.

34. The method of claim 25, wherein the filler wire comprises a material selected from the group consisting of 718 Inconel and 308 stainless steel.

35. A plasma arc welding apparatus comprising:

a plasma arc torch, having a hollow non-consumable electrode; and a wire guide, disposed coaxially inside of the plasma arc torch, wherein the wire guide directs a non-electrified filler wire through the center of the hollow non-consumable electrode during plasma arc welding.

36. A method of welding a workpiece, comprising, in the order presented:

a) providing a plasma arc welding torch comprising:
   a hollow non-consumable electrode;
   wire guide means, disposed coaxially with said hollow non-consumable electrode, for guiding and directing a non-electrified filler wire through the center of the hollow non-consumable electrode and into a plasma arc; and
   coaxial containment means having a central opening, disposed coaxially around the hollow non-consumable electrode, for containing and directing a coaxial flow of plasma gas around the outside surface of the hollow non-consumable electrode and out through the central opening;

b) coaxially flowing a plasma gas in-between the hollow non-consumable electrode and the coaxial containment means;

c) striking a low current arc between the hollow non-consumable electrode and the coaxial containment means, whereby at least some of the flowing plasma gas becomes ionized;

d) striking a high current plasma arc between the hollow non-consumable electrode and the workpiece:

e) feeding the non-electrified filler wire coaxially through the wire guide means and through the hollow non-consumable electrode into the plasma arc;

f) melting the tip of the non-electrified filler wire with the plasma arc;

g) flowing the melted material from the non-electrified filler wire through the central opening in the coaxial containment means; and h) depositing the melted material onto the workpiece.

* * * * *